United States Patent

Ashill et al.

[11] 3,880,384
[45] Apr. 29, 1975

[54] DIRECT LIFT CONTROL OF AIRCRAFT

[75] Inventors: Patrick Ralph Ashill, Bromham; David Norman Foster, Bedford, both of England

[73] Assignee: The Secretary of State for Defence in Her Britannic Majesty's Government of the United Kingdom of Great Britain and Northern Ireland, London, England

[22] Filed: Mar. 12, 1973

[21] Appl. No.: 340,305

[30] Foreign Application Priority Data
Mar. 14, 1972 United Kingdom............... 11828/72

[52] U.S. Cl............................................. 244/42 D
[51] Int. Cl. ............................................. B64c 3/58
[58] Field of Search......... 244/42 D, 42 DC, 42 CC, 244/42 CB, 42 CA, 42 C, 42 B, 42 A, 42 R, 40 R, 35 R, 34 R, 35 A

[56] References Cited
UNITED STATES PATENTS

| | | | |
|---|---|---|---|
| 1,759,164 | 5/1930 | Lyons | 244/35 R |
| 1,773,281 | 8/1930 | Scott | 244/35 R |
| 2,120,760 | 6/1938 | Lumiere | 244/42 D |
| 3,614,028 | 10/1971 | Kleckner | 244/42 DA X |

Primary Examiner—Trygve M. Blix
Assistant Examiner—Paul E. Sauberer
Attorney, Agent, or Firm—Stevens, Davis, Miller & Mosher

[57] ABSTRACT

A direct lift control device for an aircraft of the type having externally blown flaps comprises two fences, one on either side of an axis of an engine jet efflux impinging on a flap, each fence being rotatable between a position flush with the flap and a position substantially normal to the flap and substantially parallel to the efflux axis.

8 Claims, 6 Drawing Figures

DIRECT LIFT CONTROL OF AIRCRAFT

This invention relates to lift control devices for aircraft of the type wherein efflux from a propulsion gas turbine engine impinges on a wing flap when the flap is in its maximum lift position. Flaps of this type, referred to herein as externally blown flaps, are a known means of increasing the effective maximum lift coefficient of a wing and thereby decreasing the stalling speed of an aircraft to which the wing is attached.

When the pilot of a conventionally controlled aircraft in a steady non-turning flight condition wishes to alter that flight condition he does so by altering the total aircraft lift, which is provided mainly by the wings with contributions from the tailplane and, in some cases, from the fuselage. The total aircraft lift can be altered either by manipulation of the engine thrust, and hence the aircraft speed, the tailplane controls, and hence the angle of attack of the wings, or both.

Manipulation of the tailplane controls results in a change of tailplane lift in the opposite sense to the required change of total aircraft lift. There is therefore, whilst the aircraft inertia in pitch resists the pitching moment caused by the change in tailplane lift, a temporary period when the change in total aircraft lift is in the opposite sense to the required change.

In most flight conditions the last mentioned effect is of little consequence. It is however potentially dangerous in the cases of aircraft which are required to overshoot from an approach to land, particularly large aircraft and STOL (short take-off and landing) aircraft which approach the ground relatively steeply and slowly. In such cases rates of descent must be converted to level flight or to rates of ascent in flight conditions where aircraft response to controls is sluggish. Loss of tailplane lift is in these cases extremely undesirable.

Various devices have been considered for providing what is known as direct-lift control, whereby total aircraft lift can be altered rapidly with minimal change in aircraft attitude — that is, without use of tailplane controls. Devices which have been considered are:

a. Fast acting spoilers on the upper surface of a wing. Retraction of these spoilers from an extended position provides an increase of lift.

b. Auxiliary flaps deployed by rapid-response actuators. The lift increase obtained by deployment of such flaps is accompanied by a large increase in drag, and requires increased engine thrust to maintain speed.

c. Engine thrust attenuation in conjunction with externally blown flaps. With this arrangement an increase in thrust results in an increase in lift before the increased thrust has raised aircraft speed.

At low engine speeds, such as are likely to be in use during an approach to land, thrust increases cannot be rapidly obtained due to the comparatively slow reaction of jet engines to control inputs. Consequently the effects of (c), and the maintenance of speed required by (b) are adversely affected by engine characteristics.

This invention provides direct lift control using externally blown flaps independent of engine thrust changes.

According to the invention a direct lift control device for an aircraft includes a flap for movement between a retracted and an extended position on an aircraft wing, the flap being so arranged relative to an aircraft mounted gas turbine engine that efflux from the engine impinges on the flap in the extended position, the flap having mounted thereon two fences, one on each side of the axis of the efflux, each fence being rotatable between a first position flush with the flap and a second position substantially normal to the flap and substantially parallel to the efflux axis. Preferably each fence rotates from the position normal to the flap to the position flush with the flap in a direction away from the efflux axis.

The gas turbine engine will usually be mounted beneath the wing carrying the flap and forward of the flap.

An aircraft equipped with direct lift control devices according to the invention may have one or more engines associated with each wing, and each wing may carry one flap which acts in conjunction with all the engines associated with that wing or a plurality of flaps each of which acts in conjunction with one engine.

Movement of the fence from the normal position to the flush position results in an increase of lift of a wing/flap combination.

Some embodiments of the invention, and the results of some wing tunnel tests carried out on models of the invention, will now be described, by way of example only, with reference to the accompanying diagrammatic drawings, of which:

Figure 1:
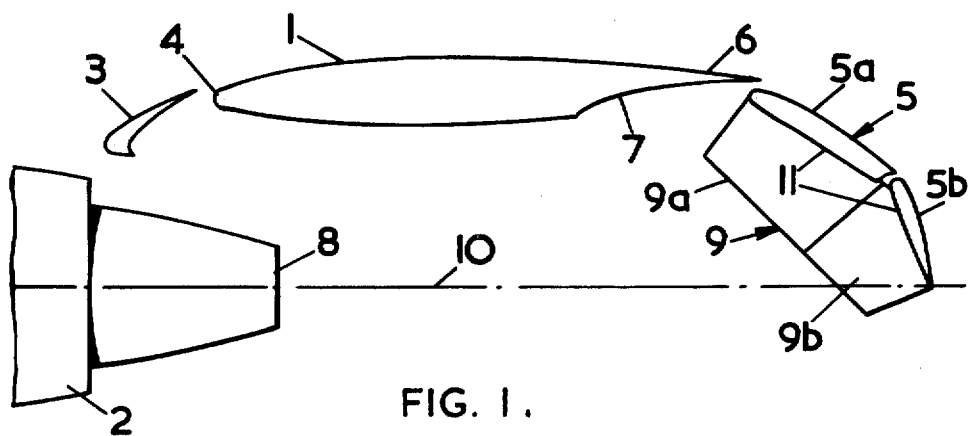
FIG. 1 is a side elevation of an aircraft wing.
Figure 2:
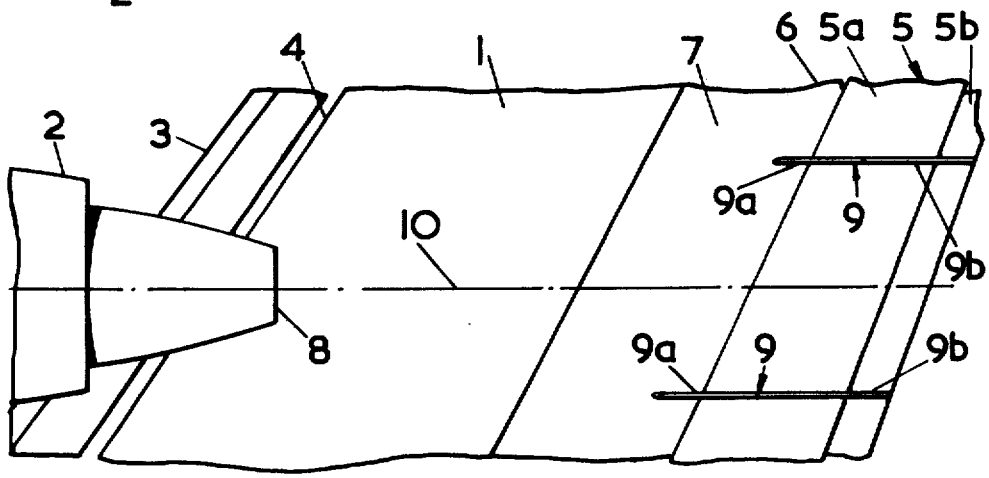
FIG. 2 is a plan of the undersurface of the wing shown in FIG. 1.

An aircraft wing 1 (FIGS. 1 and 2) having mounted thereunder an engine 2 has a slat 3 at its leading edge 4 and a flap 5 at its trailing edge 6. The slat 3 and flap 5 are shown in extended positions which allow the wing 1 to provide its maximum lift. In normal flight conditions the slat 3 is retracted to abut the leading edge 4 of the wing 1 and the flap 5 is retracted to lie within a recess 7 at the trailing edge 6 of the wing 1. For clarity the means for operating the slat 3 and flap 5, and the means for mounting the engine 2, examples of which are well known, are omitted from these figures.

The flap 5 is formed of two segments 5a, 5b and efflux flow from an exhaust nozzle 8 of the engine 2 impinges on the flap 5.

Two fences 9, mounted one on either side of an axis 10 of the efflux are mounted on the flap 5. Each fence 9 is divided into a portion 9a on flap segment 5a and a portion 9b on flap segment 5b and is rotatable about a hinge line 11 between an extended position, as shown, normal to the flap 5 and parallel to the efflux axis 10 and a position flush with the flap 5. The direction of rotation to the flush position is away from the efflux axis 10 and is effected by, for example, actuation of hydraulic or pneumatic jacks (not shown).

Figure 3:
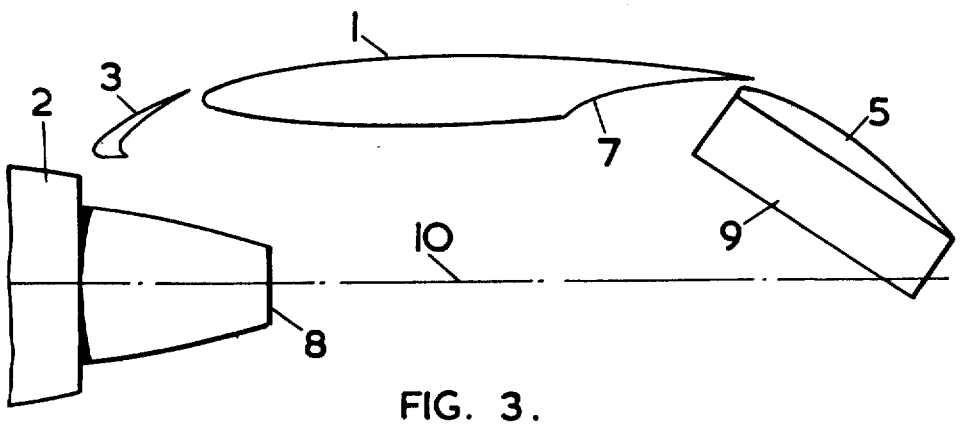
FIG. 3 is a side elevation of an alternative form of aircraft wing.

In an alternative form (FIG. 3) the flap 5 is formed of one segment only, and the fences 9 are of unitary construction. It is well known that externally blown flaps, such as flaps 5, generate more lift than do unblown flaps due to aerodynamic reactions between the jet efflux and the flaps. Extension of the fences 9 impedes the spread of the jet efflux across the span of the flap and thereby reduces the lift.

In operation, an aircraft embodying the invention makes an approach to land with the fences 9 in the extended position. Should the aircraft be required to overshoot the fences 9 are rotated to the flush position. This results in an immediate increase in lift which assists the overshoot procedure.

Figure 4A:
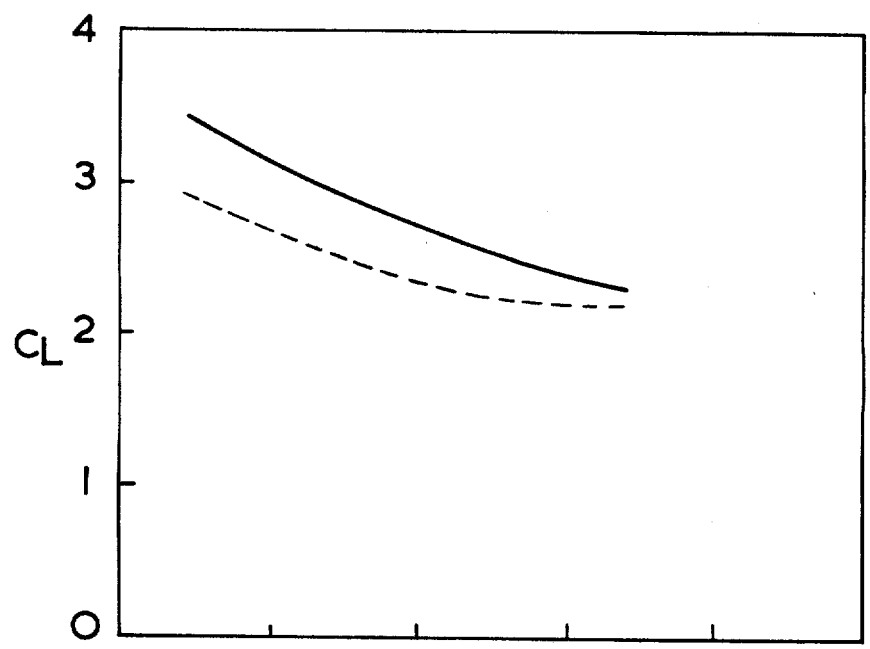
FIGS. 4a, 4b and 4c are graphs showing results of wind tunnel tests on a model of a wing embodying the invention.
Figure 4B:
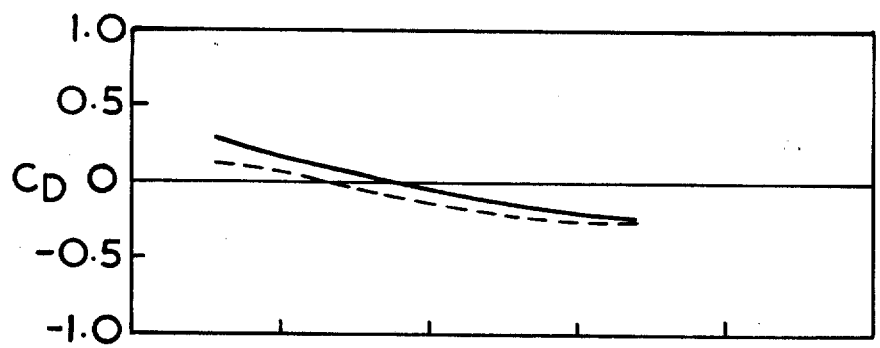
Figure 4C:
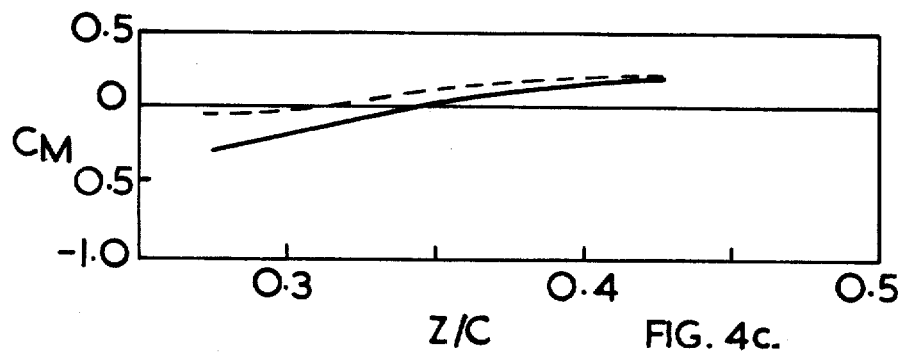

FIGS. 4a, b and c show the results of wind tunnel tests on a model of a wing embodying the invention. In each of these Figures the full line represents the results with fences 9 flush with flaps 5, and the dotted line represents results with fences 9 extended. The tests were conducted with the thrust exerted by the simulated gas turbine engine efflux constant. FIG. 4a shows lift coefficient $C_L$, FIG. 4b drag coefficient $C_D$ and FIG. 4c pitching moment coefficient $C_M$, each plotted against Z/C, where Z is the distance below the wing of the efflux axis 10 and C is the basic wing chord. For the purposes of FIG. 4b, drag was defined as the force acting on the model in the streamwise direction. This definition therefore includes the net thrust associated with the engine.

It will be apparent from these Figures that movement of the fences 9 from the normal position to the flush position results in an appreciable increase in lift with only minor effects on drag and pitch.

It should be appreciated that whilst in the embodiments of the invention as described and illustrated the fences 9 are normal to the flaps 5, parallel to and equally spaced on either side of the efflux axis 10 the invention is not limited to such dispositions. Depending on the characteristics of a particular wing/engine combination some departure from these dispositions might well be beneficial.

What I claim is:

1. A direct lift control device, for an aircraft having a fuselage and two wings, comprising:
   at least one flap on each wing and means for moving each flap between a retracted position and an extended position;
   for each flap a gas turbine engine so positioned that efflux therefrom impinges on the flap when the flap is in the extended position; and
   on each flap, two fences, one on each side of a central axis of the efflux and means for moving each fence between a first position flush with the flap and a second position substantially normal to the flap and substantially parallel to the efflux axis, whereby spread of said efflux across the span of the flap is reduced.

2. A direct lift control device as claimed in claim 1 wherein each fence moves from the second position to the first position in a direction away from the efflux axis.

3. A direct lift control device as claimed in claim 1 wherein each fence in the second position is normal to the flap.

4. A direct lift control device as claimed in claim 1 wherein each fence in the second position is parallel to the efflux axis.

5. A direct lift control device as claimed in claim 1 wherein each fence in the second position is normal to the flap, parallel to the efflux axis, and moves from the second position to the first position in a direction away from the efflux axis.

6. A direct lift control device as claimed in claim 1 wherein each flap is formed in two sections articulated relative to one another along a spanwise axis, each fence on the flap having a portion associated with each section.

7. A direct lift control device as claimed in claim 5 wherein each flap is formed in two sections articulated relative to one another along a spanwise axis, each fence on the flap having a portion associated with each section.

8. A turbofan-powered STOL aircraft having a fuselage and a wing on said fuselage, said wing having a leading edge and a trailing edge, a flap along said trailing edge and adapted to be moved between a retracted position and an extended position, a gas turbine engine disposed whereby efflux therefrom impinges on the said flap when the flap is in its extended position, and a pair of fences pivotally attached to the underside of said flap with one fence on each side of a central axis of the efflux and adapted to be moved between a first position flush with the underside of the flap and a second position substantially normal to the flap, said fences when normal to the flap extending along the underside of the flap in a plane which is parallel to the said efflux axis.

* * * * *